Jan. 20, 1931.     A. E. SMAILL     1,789,932
PROCESS OF EXTRACTING METAL VALUES FROM ORES
Filed Jan. 3, 1928
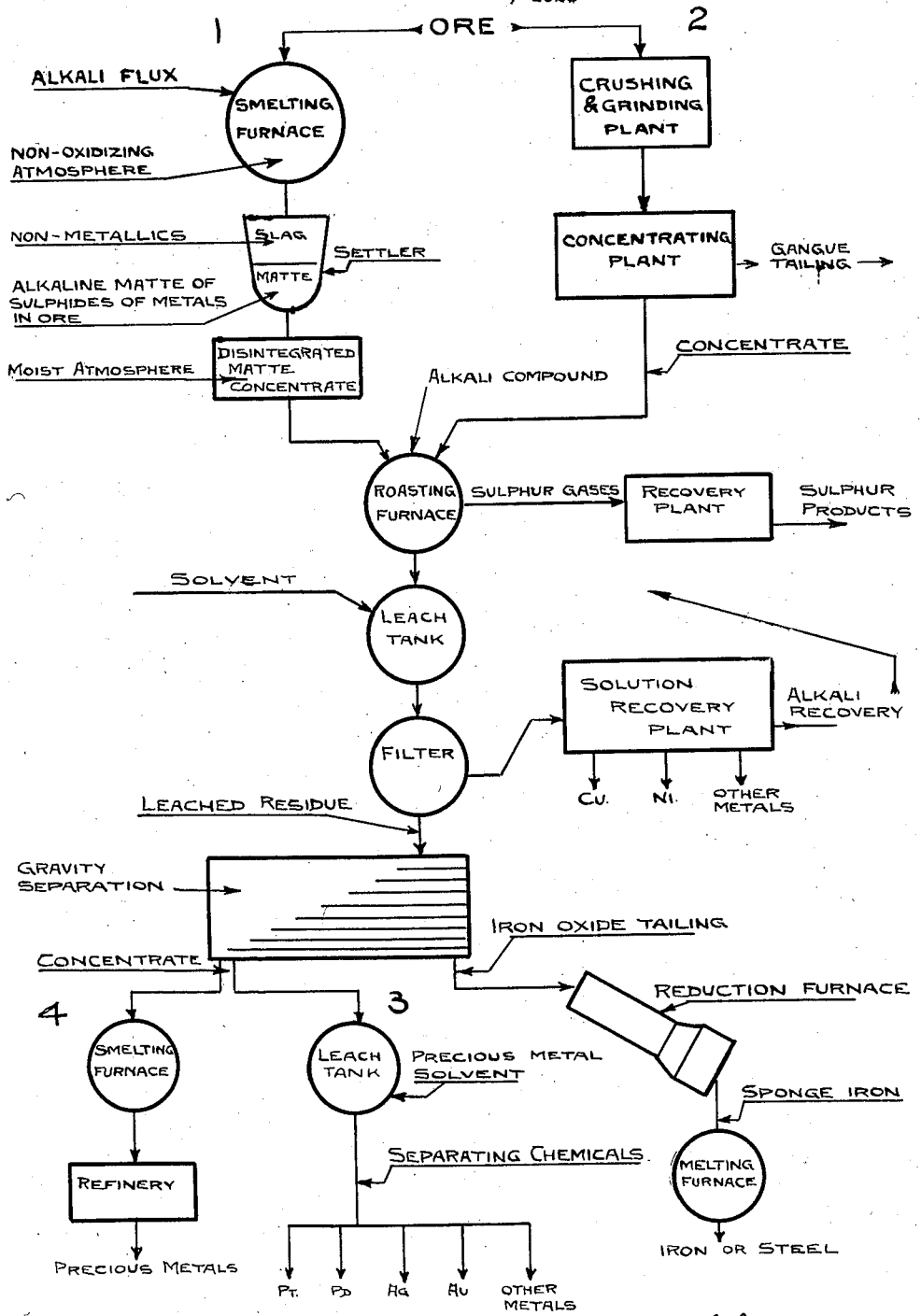

Patented Jan. 20, 1931

1,789,932

UNITED STATES PATENT OFFICE

ALBERT EDWARD SMAILL, OF OTTAWA, ONTARIO, CANADA

PROCESS OF EXTRACTING METAL VALUES FROM ORES

Application filed January 3, 1928, Serial No. 244,378, and in Canada January 7, 1927.

This invention relates to a process of treating ores for the recovery of the metal values therefrom.

Many ores contain relatively small percentages of precious metals, such as gold, platinum, palladium, osmium, irridium, etc. In some cases the percentages are so small that difficulty is experienced in the commercial extraction of such metals owing to the large volume, or mass, of materials to be treated.

It is an object of this invention to provide a process whereby the precious metal content of ores as well as all associated metal value may be economically recovered. The process involves the concentration of substantially all the metal values to greatly reduce the volume, or mass, of material to be treated and the separation of the precious metal content therefrom so that the same may be further treated to extract the precious metal values in desired form.

In a previous United States Patent, No. 1,593,509, I have described a process for treating ore, whereby substantially all the metal values are recovered in the form of a self disintegrating matte, which may be further treated for the recovery therefrom of the metal values. This present invention provides a further improvement in the extraction of the precious metal values from materials of this character.

By way of example, the process will be described with reference to the treatment of an ore containing iron, nickel and copper in sulphide form as well as smaller percentages of precious metal values.

The accompanying flow sheet, in diagrammatic form, will help comprehending the process. The sequence and operations mentioned in the following paragraph will be found under group (1), of the diagram.

The ore is smelted, with an alkaline flux under non-oxidizing conditions to produce a self-disintegrating matte containing substantially all the metal values of the ore. The slag is removed and the disintegrated matte is roasted to change the sulphides into sulphates and then decompose the iron, in particular, to the oxide form. This is accomplished by keeping the temperature of the roast below 600 deg. C., a temperature at, or below, which the sulphates of nickel and copper will not decompose. The alkali content of the matte is beneficial to the recovery of the nickel values owing to the formation of soluble nickel compounds, which are not decomposed at the temperature of roasting. The alkali content of the matte may be increased by adding to the disintegrated matte before roasting, alkali, preferably in the form of sulphate, or, by increasing the amount of alkali in flux used in smelting.

The roasted matte is then leached with hot water to extract the copper, nickel and any other soluble sulphates, from which solution the metal may be recovered by electrolysis, or otherwise, as desired. Weak acids, brine, or solutions of ammonia compounds may be used as solvent if required but the hot water is usually sufficient to dissolve the sulphates.

Metal values not removed by the leaching operation remain in the residue with the differentiation in specific gravity of constituents improved by the treatment. These will include the precious metal values which it is desired to recover as well as all associated metal value. In view of the small percentage of precious metals usually found in such ores and consequently in the leached residue it is now desirable to take advantage of the change in state of the material and subject the leached residue to a selective gravity concentration, by means of apparatus, such as wiffley tables. In this way nearly all of the iron oxide is found in the tailing while upwards of 80% of the precious metal values of the leached residue may be restricted to a concentrate of less than 5% of the weight of the leached residue so treated. Re-tabling the middling product results in a minimum total recovery of 95% of the precious metal values. The volume of this concentrate, containing the precious metal values, is then such that the same may be readily treated following the sequence and operations as indicated under Figures (3) and (4) on the diagram, to extract therefrom the precious metal values by any desired process. For this purpose I have successfully recovered from the concentrate, the gold and other precious metal values by treating the concentrate with a solvent for precious metal values, such as, water and chlorine gas. The chlorine forms water soluble compounds with the previous metal values, while the iron is substantially unattacked.

This process may be carried out following the sequence of operations indicated under Figure (2) on the diagram, using clean ore or any form of preliminary concentration to remove the gangue material from the mineral, the clean ore or concentrate being roasted with, or without the addition of an alkali metal compound and further treated as already described. Where nickel is not present a preliminary test will show if it be of any advantage to add an alkali sulphate before roasting.

It will be observed that there are no waste products after the matte, or concentrate of the ore, is produced and that the successive operations are directed to separating all the metal values into recoverable form. The precious metal values are separated from the leached residue containing substantial volume of iron values, in a concentrate of such volume that it may be readily treated for the extraction of the precious metal values. Furthermore, the tailings are substantially pure iron oxide and are thus available for direct use as such.

While the use of concentrative tables is very well known, its application in this way to the extraction of precious metal values has not heretofore been recognized although the problem of handling large volumes of materials containing small percentages of precious metal values has been a difficult one.

I claim:—

1. In a process of treating ore, or other material, containing ferrous and non-ferrous metal sulphide, associated with precious metal value for the recovery of all the metal values, by roasting to produce maximum solubility of the non-ferrous values, excepting precious metal, and maximum insolubility of the ferrous values, followed by leaching to remove said soluble values, the step, comprising subjecting the precious metal value containing leached residue, to selective gravity classification, to concentrate the precious metal values and segregate, for recovery, all associated metal value, as described.

2. A process of concentrating the precious metal values associated with sulphide ore, or ore concentrates, with the recovery of all associated metal values, comprising, roasting finely divided sulfide material to produce maximum solubility of the non-ferrous values, excepting precious metal value, and maximum insolubility of the ferrous values, leaching to remove the soluble compounds so formed, then subjecting the precious metal value containing leached residue to selective gravity classification to concentrate the precious metal values into small volume and segregate, for recovery, all associated metal value.

3. A process for the recovery of all the metal values of a sulphide ore, or other material, carrying nickel sulphide, associated with precious metal values, comprising roasting finely divided sulphide, with alkali sulphate, at a temperature not exceeding 600 degree centigrade, to produce maximum solubility of the nickel and other associated non-ferrous values, excepting precious metal value, with maximum insolubility of the ferrous values; leaching to remove the soluble compounds so formed then subjecting the precious metal value containing leached residue, to selective gravity classification to concentrate the precious metal values and segregate, for recovery, all associated metal value.

4. A process for the recovery of all the metal values of a sulphide ore, or sulphide concentrates, associated with precious metal values, comprising, roasting finely divided sulphide material, to produce maximum solubility of the non-ferrous values, excepting precious metal value, with maximum insolubility of the ferrous values, followed by leaching to remove the soluble values so formed, then subjecting the precious metal value containing leached residue, to selective gravity classification to concentrate the precious metal values into small volume and segregate, for recovery, all associated metal value.

5. The treatment of finely divided, precious metal value containing residue, from roasting and leaching sulfide, to selective gravity differentiation, to concentrate the precious metal values and segregate, for recovery, all associated metal value.

6. A process for the recovery of all values of a sulphide ore, or sulphide concentrate, associated with precious metal value, comprising, oxidizing finely divided sulfide material at, or above, a temperature sufficient to completely oxidize ferrous value, then subjecting the finely divided oxidized material to selective gravity differentiation to segregate, for recovery, all the associated metal values.

Ottawa, Canada, December 31st, 1927.

A. E. SMAILL.